(12) United States Patent
Panara et al.

(10) Patent No.: US 10,948,045 B2
(45) Date of Patent: Mar. 16, 2021

(54) METHOD FOR STABILIZING TRANSVERSAL OSCILLATIONS OF A ROTOR

(71) Applicant: NUOVO PIGNONE TECNOLOGIE SRL, Florence (IT)

(72) Inventors: Daniele Panara, Florence (IT); Alberto Guglielmo, Florence (IT)

(73) Assignee: NUOVO PIGNONE TECNOLOGIE SRL, Florence (IT)

( * ) Notice: Subject to any disclaimer, the term of this patent is extended or adjusted under 35 U.S.C. 154(b) by 0 days.

(21) Appl. No.: 15/743,037

(22) PCT Filed: Jul. 13, 2016

(86) PCT No.: PCT/EP2016/066680
§ 371 (c)(1),
(2) Date: Jan. 9, 2018

(87) PCT Pub. No.: WO2017/009387
PCT Pub. Date: Jan. 19, 2017

(65) Prior Publication Data
US 2019/0072153 A1    Mar. 7, 2019

(30) Foreign Application Priority Data

Jul. 14, 2015 (IT) .................. 102015000033881

(51) Int. Cl.
*F16F 15/00* (2006.01)
*F16F 7/00* (2006.01)
*F16F 15/10* (2006.01)

(52) U.S. Cl.
CPC .............. *F16F 15/002* (2013.01); *F16F 7/00* (2013.01); *F16F 15/10* (2013.01);
(Continued)

(58) Field of Classification Search
CPC .. F16F 15/002; F16F 7/00; F16F 15/10; F16F 2230/18; F16F 2230/0011; F16F 2230/08; F16F 2228/002
See application file for complete search history.

(56) References Cited

U.S. PATENT DOCUMENTS

| | | | |
|---|---|---|---|
| 2009/0057073 A1* | 3/2009 | Ishii | ..................... B60T 5/00 188/71.6 |
| 2012/0063884 A1* | 3/2012 | Klingels | ............... F01D 11/22 415/1 |

FOREIGN PATENT DOCUMENTS

| | | |
|---|---|---|
| DE | 10 2013 100 965 A1 | 7/2014 |
| WO | 2014/118246 A1 | 8/2014 |

OTHER PUBLICATIONS

A..D. Dimarogonas, Newkirk Effect: Thermally Induced Dynamic Instability of High-Speed Rotors, 1973, ASME, Presentation at the Gas Turbine Conference and Products Show, pp. 3-7. (Year: 1973).*

(Continued)

*Primary Examiner* — Thomas C Lee
*Assistant Examiner* — Anzuman Sharmin
(74) *Attorney, Agent, or Firm* — Baker Hughes Patent Org.

(57) ABSTRACT

A method for stabilizing transversal oscillations of a rotor including the steps of acquiring a first signal representing a value of transversal oscillations of a rotor; estimating a value of a thermal gradient from the first signal; computing a value of an actuation parameter from the value of thermal gradient; emitting an actuation signal representing the value of the actuation parameter.

10 Claims, 1 Drawing Sheet

(52) U.S. Cl.
CPC . *F16F 2228/002* (2013.01); *F16F 2230/0011* (2013.01); *F16F 2230/08* (2013.01); *F16F 2230/18* (2013.01)

(56) References Cited

OTHER PUBLICATIONS

Lili Gu, A Review of Morton Effect: From Theory to Industrial Practice, Tribology Transactions, vol. 61:2, pp. 381-391. (Year: 2018).*

Childs, D.W., and Saha, R., "A New, Iterative, Synchronous-Response Algorithm for Analyzing the Morton Effect," Journal of Engineering for Gas Turbines and Power, vol. 134, Issue 7, pp. 1-9 (May 23, 2012) (Abstract).

Larsson., B., "Journal Asymmetric Heating—Part I: Nonstationary Bow," Journal of Tribology, vol. 121, Issue 1, pp. 157-163 (Jan. 1, 1999) (Abstract).

Italian Search Report and Written Opinion issued in connection with corresponding IT Application No. 102015000033881 dated Apr. 13, 2016.

International Search Report and Written Opinion issued in connection with corresponding PCT Application No. PCT/EP2016/066680 dated Sep. 13, 2016.

International Preliminary Report on Patentability issued in connection with corresponding PCT Application No. PCT/EP2016/066680 dated Jan. 25, 2018.

* cited by examiner

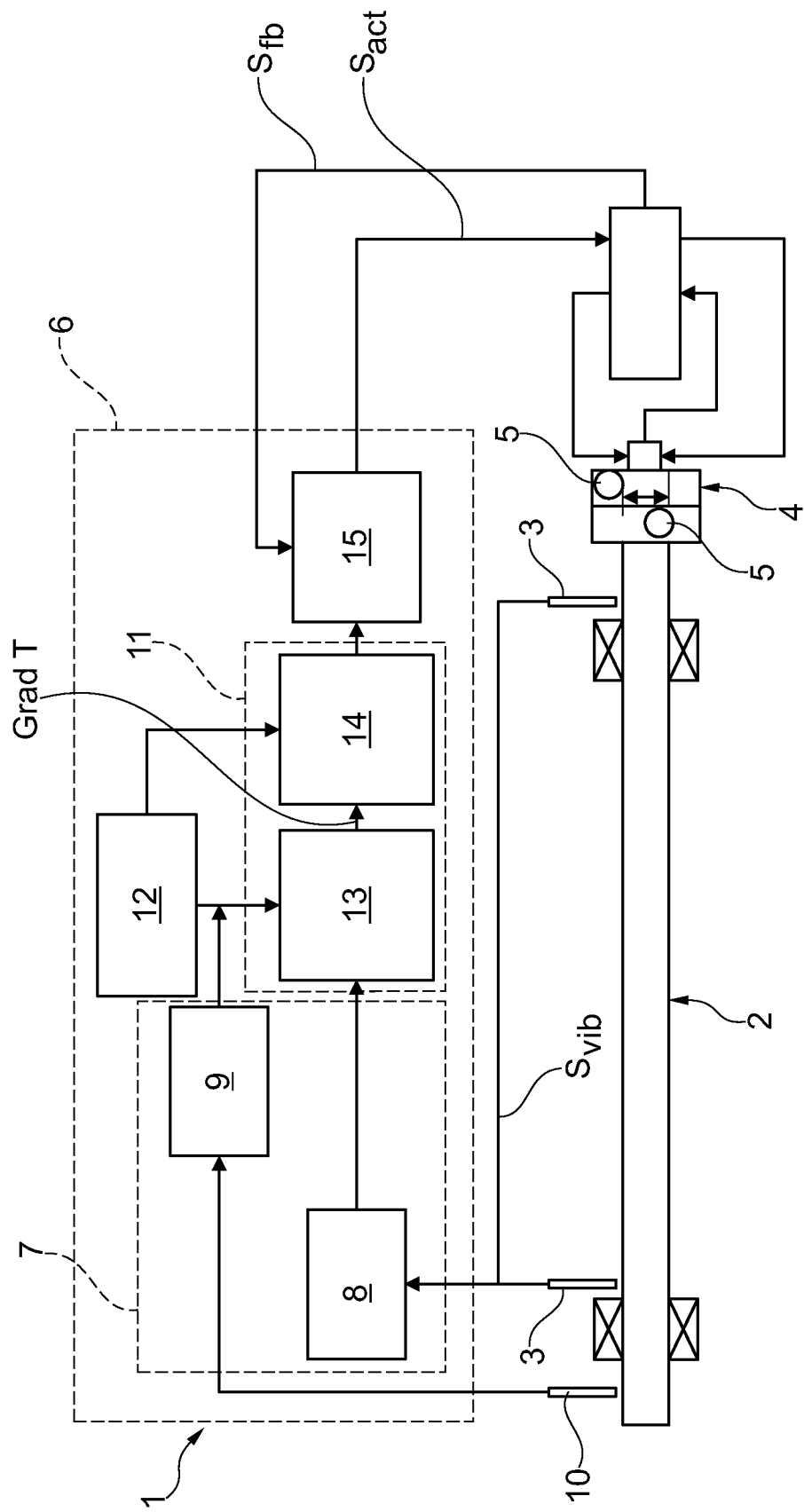

METHOD FOR STABILIZING TRANSVERSAL OSCILLATIONS OF A ROTOR

BACKGROUND OF THE INVENTION

The subject matter of the present disclosure relates to a method for stabilizing transversal oscillations of a rotor, particularly a rotor having hydrodynamic or hydrostatic bearings. Particularly, but not exclusively, this disclosure is relevant to those bearings in which a fluid is used as lubricant.

It is understood in the technical field that a rotor-stator system, such as the one that is part of a turbomachine, suffers from a thermal-fluidodynamic interaction known as the Morton effect. Indeed, because of unavoidable rotor residual unbalance, the rotor does not revolve around a fixed axis of rotation but, on the contrary, has a small precession movement. Such a precession movement causes that one part of the rotor is always exposed to a minimum clearance with respect to the opposite side. Due to the different clearance, the same part is exposed to higher fluid velocity with respect to the other side. As a result, due to fluid viscous dissipation, one part of the rotor heats more than the opposite part, which subject the rotor itself to a thermal gradient and consequent thermal deformation. The thermal deformation determines a consequent unbalance and hence rotor oscillations. Potentially, this causes a runaway instability of the rotor and its eventual failure.

In the state of the art it is known to correct the generic oscillations of a rotor, independently of their origin. Disadvantageously, this system works only ex-post, and is therefore unable to prevent the origin of unwanted oscillations.

SUMMARY OF INVENTION

Embodiments of the invention therefore relate to a method for stabilizing transversal oscillations of a rotor. Such method comprises the step of acquiring a first signal representing a value of transversal oscillations of a rotor. The method also comprises the step of estimating a value of a thermal gradient from the first signal. Afterwards, a value of an actuation parameter is computed from the value of thermal gradient. An actuation signal, representing the value of the actuation parameter, is then emitted.

Embodiments of the invention relate to a device for stabilizing transversal oscillations of a rotor. Such device comprises a sensor configured to measure transversal oscillations of a rotor. The sensor is also configured to emit a sensor signal representing a value of the transversal oscillations. The device comprises an actuator configured to apply a transversal force to the rotor. The actuator is also configured to acquire an actuation signal.

The device comprises a control unit. The control unit comprises a sensor module configured to acquire the sensor signal. The control unit also comprises a processing module configured to estimate a value of a thermal gradient from the sensor signal. The processing module is also configured to compute a value of an actuation parameter from the value of the thermal gradient. The control unit also comprises an actuation module, which is configured to emit the above mentioned actuation signal which represent the value of the actuation parameter.

In an embodiment, the method and the device described above are able to prevent the thermal induced oscillations from appreciably affect the performance of the rotor.

BRIEF DESCRIPTION OF THE DRAWING

Further details and specific embodiments will refer to the attached drawings, in which:

FIG. 1 is a schematic representation of the functioning of a device for stabilizing transversal oscillations of a rotor according to an embodiment of the present invention.

DETAILED DESCRIPTION

The following description of exemplary embodiments refer to the accompanying drawings. The same reference numbers in different drawings identify the same or similar elements. The following detailed description does not limit embodiments of the invention. Instead, the scope of embodiments of the invention is defined by the appended claims.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

With reference to the attached drawings, with the number 1 is indicated a device for stabilizing transversal oscillations of a rotor. The rotor itself, not part of embodiments of the present invention but schematically represented for reference, is indicated with the number 2.

The device 1 comprises a sensor 3 configured to measure transversal oscillations of the rotor 2. Such sensor 3 is also configured to emit a first signal "S_vib", which represents a value of the transversal oscillations. With more detail, the sensor 3 may be a sensor probe. According to an embodiment, the device 1 may comprise a plurality of sensor 3, each configured to attached to a plurality of vibration probes applied onto the rotor 2.

The device 1 also comprises an actuator 4, configured to apply a transversal force to the rotor 2. The actuator 4 is configured to acquire an actuation signal "S_act". According to the embodiment shown in FIG. 1, the actuator 4 can be a remote controlled active balancing actuator. In this kind of actuator, a set of weights 5 are shifted around the rotor 2 in order to create a load that balances the vibrations. As this kind of actuator is itself known to the person skilled in the art, it will not be described in detail in the present disclosure.

The device 1 comprises a control unit 6. Such control unit 6 will be described in detail by referring to several functional modules. This is done for ease and completeness of description only, and is not intended as a limitation of the actual implementation of the control unit 6. Indeed, the control unit 6 can be a single computer or a plurality of devices communicating to each other by either wired or wireless protocols. The control unit 6 can also be emulated via software on a machine that may not be specifically designed for the task.

The control unit 6 comprises a sensor module 7, which is configured to acquire the first signal "S_vib" previously mentioned. Specifically, the sensor module 7 comprises a vibration acquisition module 8, which receives the signal "S_vib" by the sensors 3. Furthermore, the sensors module 7 also comprises a speed monitoring module 9, which is configured to acquire a rotation speed signal "S_vel" from a keyphasor 10. The keyphasor 10, part of the rotor 2, is not considered part of embodiments of the present invention.

The control unit 6 also comprises a processing module 11, which is configured to estimate a value of a thermal gradient "Grad_T" from the first signal "S_vib".

With additional detail, the thermal gradient "Grad_T" can be computed in several ways. An example is given in Childs, D. W., & Saha, R. (2012) "A New, Iterative, Synchronous-Response Algorithm for Analyzing the Morton Effect" Journal of Engineering for Gas Turbines and Power, 134(7), 072501.

The processing module 11 is configured to compute a value of an actuation parameter "P_act" from the value of the thermal gradient "Grad_T".

The control unit 6 comprises a storage module 12. According to the embodiments of the present invention, at least during operation the storage module 12 is provided with a pre-stored numerical model of the dynamical and thermal behavior of the rotor. For example, such numerical model can be a finite element model. Alternatively, the numerical model can be a set of structural and/or thermal and/or thermo-structural proper modes, which can be parametrized as functions of the rotation speed of the rotor 2.

With additional detail, the processing module 11 is provided with an estimation module 13 for computing the value of the thermal gradient "Grad_T". Such estimation module 13 references, beyond the signal "Svib", also the rotation speed extracted by the keyphasor 10 and the numerical model stored in the storage module 12 just described.

The processing module 11 also comprises a comparison module 14, which compares the value of the thermal gradient "Grad_T" with a reference value extracted from the storage module 12. The comparison module 14 also checks if the thermal gradient "Grad_T" falls within a zone of instability of the numerical model of the rotor 2.

For interfacing with the actuator 4, the control unit 6 comprises an actuation module 15. Such actuation module 15 is configured to emit the actuation signal "S_act" which represents the value of the actuation parameter "P_act". Also, the actuation signal "S_act" can take into account a feedback signal "S_fb" which is sent back to the actuation module 15 by the actuator 5.

With more detail, the processing module 11 is configured to estimate a thermal unbalance parameter "P_therm" from the stored numerical model of the rotor 2 and from the thermal gradient "Grad_T". Also, the actuation module 15 is configured to emit the actuation signal "S_act" at least in part proportional to the thermal unbalance parameter "P_Therm". Such thermal unbalance parameter "P_Therm" can be, for example, a measure of the deviation of the center of the rotor 2 from the center of rotation due to thermal deformation.

An embodiment of the invention therefore also relates to a method for stabilizing transversal oscillations of a rotor 2. Such method can be implemented by the device 1 described above, but it should not be considered as limited to such implementation.

The method comprises the step of acquiring a first signal "S_vib" representing a value of transversal oscillations of the rotor 2. A value of the thermal gradient "Grad_T" can then be estimated from the first signal "S_vib". Particularly, this is done by referencing the numerical model described above.

A value of the actuation parameter "P_act" is computed, at least taking into account the value of the thermal gradient "Grad_T". The actuation signal "S_act" is then emitted.

With more detail, the phase of computing a value of the actuation parameter "P_act" comprises the subphase of extracting a reference value "Grad_ref" from a stored numerical model of the rotor 2. The value of the thermal gradient "Grad_T" is then compared with the reference value "Grad_ref".

The phase of computing the value of the actuation parameter "P_act" also comprises the subphase of checking if the thermal gradient "Grad_T" falls within a zone of instability of the numerical model 2, as it is not always the case. After the instability check, the actuation signal "S_act" is emitted only if the thermal gradient "Grad_T" is within a zone of instability.

With additional detail, the step of computing the value of the actuation parameter "P_act" comprises the step of estimating a thermal unbalance parameter "P_Therm" from the stored numerical model of the rotor 2 and from the thermal gradient "Grad_T". The actuation signal "S_act" is computed so that it is at least in part proportional to the thermal unbalance parameter "P_Therm". Also, the actuation signal "S_act" may also be at least in part proportional to the above mentioned feedback signal "S_fb".

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for stabilizing transversal oscillations of a rotor, the method comprising the steps of:
   acquiring a first signal representing a value of transversal oscillations of a rotor;
   estimating a value of a thermal gradient from the first signal;
   computing a value of an actuation parameter from the value of thermal gradient;
   emitting an actuation signal representing the value of the actuation parameter; and
   actuating at least one weight via an actuator about the rotor to stabilize the transversal oscillations of the rotor.

2. The method according to claim 1, wherein the phase of computing a value of an actuation parameter comprises the subphase of extracting a reference value from a stored numerical model of the rotor; comparing the value of the thermal gradient with the reference value.

3. The method according to claim 1, wherein the phase of computing a value of an actuation parameter comprises the subphase of checking if the thermal gradient falls within a zone of instability of the numerical model of the rotor.

4. The method according to claim 1, wherein the actuation signal is emitted after the instability check only if the thermal gradient is within a zone of instability.

5. The method according to claim 2, wherein the step of computing a value of an actuation parameter comprises the step of estimating a thermal unbalance parameter from the stored numerical model of the rotor and the thermal gradient, the actuation signal being at least in part proportional to the thermal unbalance parameter.

6. A device for stabilizing transversal oscillations of a rotor comprising:
   a sensor configured to measure transversal oscillations of the rotor and to emit a first signal representing a value of the transversal oscillations;

an actuator configured to actuate at least one weight about the rotor to stabilize the transversal oscillations of the rotor, the actuator being configured to acquire an actuation signal; and a control unit including a first circuitry, comprising:
- a sensor module including a second circuitry and configured to acquire the first signal;
- a processing module including a third circuitry and configured to estimate a value of a thermal gradient from the first signal; the processing module being configured to compute a value of an actuation parameter from the value of thermal gradient; and
- an actuation module including a fourth circuitry, configured to emit the actuation signal representing the value of the actuation parameter.

7. The device according to claim 6, wherein the control unit comprises a storage module having a fifth circuitry and a stored numerical model of the rotor; a comparison module having a sixth circuitry for comparing the value of the thermal gradient with a reference value extracted from the storage module.

8. The device according to claim 6, wherein the control unit comparison module is also configured to check if the thermal gradient falls within a zone of instability of the numerical model of the rotor.

9. The device according to claim 6, wherein the processing module is configured to estimate a thermal unbalance parameter from the stored numerical model of the rotor and the thermal gradient, the actuation module being configured to emit the actuation signal at least in part proportional to the thermal unbalance parameter.

10. The device according to claim 7, wherein the first circuitry is a computer, the second circuitry is a computer, the third circuitry is a computer, the fourth circuitry is a computer, the fifth circuitry is a computer, and the sixth circuitry is a computer.

* * * * *